United States Patent [19]

Hines

[11] Patent Number: 5,174,105
[45] Date of Patent: Dec. 29, 1992

[54] HOT DAY M & I GAS TURBINE ENGINE AND METHOD OF OPERATION

[75] Inventor: William R. Hines, Montgomery, Ohio

[73] Assignee: General Electric Company, Cincinnati, Ohio

[21] Appl. No.: 610,882

[22] Filed: Nov. 9, 1990

[51] Int. Cl.[5] ............................. F02C 6/00; F02G 3/00
[52] U.S. Cl. ................................. 60/39.04; 60/39.07; 60/39.29
[58] Field of Search ............... 60/39.04, 39.07, 39.161, 60/39.29, 232

[56] References Cited

U.S. PATENT DOCUMENTS

| | | | |
|---|---|---|---|
| 2,873,576 | 2/1959 | Lombard . | |
| 3,255,586 | 6/1966 | Hennig et al. | 60/39.161 |
| 3,688,504 | 9/1972 | Hutchinson et al. | 60/39.29 |
| 3,908,362 | 9/1975 | Szydlowski | 60/226 R |
| 3,964,257 | 6/1976 | Lardellier | 60/226 R |
| 4,054,030 | 10/1977 | Pedersen | 60/262 |
| 4,055,946 | 11/1977 | Sens | 60/204 |
| 4,068,471 | 1/1978 | Simmons | 60/262 |
| 4,080,785 | 3/1978 | Koff et al. | 60/226 R |
| 4,157,010 | 6/1979 | Sailer | 60/39.04 |
| 4,448,019 | 5/1984 | Klees | 60/204 |
| 4,631,914 | 12/1986 | Hines | 60/39.05 |
| 4,845,939 | 7/1989 | Jordan et al. | 60/226.1 |
| 4,959,954 | 10/1990 | Nishijima | 60/39.07 |
| 4,991,394 | 2/1991 | Wright | 60/39.07 |
| 5,059,093 | 11/1991 | Khalid et al. | 60/39.07 |

FOREIGN PATENT DOCUMENTS

| | | |
|---|---|---|
| 0056930 | 5/1981 | Japan . |
| 1018166 | 1/1966 | United Kingdom . |
| 1308400 | 2/1973 | United Kingdom . |
| 2094404 | 9/1982 | United Kingdom . |
| 2193999 | 2/1988 | United Kingdom . |
| 2235247 | 2/1991 | United Kingdom . |
| 85/03550 | 8/1985 | World Int. Prop. O. . |

OTHER PUBLICATIONS

General Electric Company, CF6-80C2 Engine Airflow FADEC Control, single page in color, undated.

Primary Examiner—Richard A. Bertsch
Assistant Examiner—Howard R. Richman
Attorney, Agent, or Firm—Jerome C. Squillaro; James P. Davidson

[57] ABSTRACT

A method of operating a dual rotor gas turbine engine includes bypassing a predetermined portion of compressed airflow from a high pressure compressor to downstream of a high pressure turbine first stage nozzle, and increasing core speed of the engine to a value greater than a reference value for improving hot day lapse rate curve and output shaft horsepower. The method steps are performed at least at values of ambient air temperature greater than a first value thereof associated with a reference maximum value of output shaft horsepower, and without increasing high pressure compressor discharge air temperature beyond a maximum value thereof associated with the reference maximum value of the output shaft horsepower. The dual rotor, gas turbine engine includes a preexisting design, aircraft derivative core engine including a high pressure compressor and a high pressure turbine first stage nozzle. A portion of compressed airflow from the high pressure compressor is bypassed to a point downstream of the high pressure turbine first stage nozzle, and core speed is increased for increasing output shaft horsepower of a low pressure turbine without increasing high pressure compressor discharge air temperature beyond a maximum value thereof.

27 Claims, 3 Drawing Sheets

5,174,105

HOT DAY M & I GAS TURBINE ENGINE AND METHOD OF OPERATION

TECHNICAL FIELD

The present invention relates generally to gas turbine engines, and, more specifically, to aircraft gas turbine engines adapted for land-based and marine applications.

BACKGROUND ART

Marine and land-based industrial (M & I) gas turbine engines are frequently derived from engines designed for and used in various types of aircraft. Such M & I engines are used, for example, for powering marine vessels, electrical generators, and various types of pumping and compression applications.

The parent gas turbine engine of an M & I engine is typically designed and constructed to be lightweight and to operate at minimum specific fuel consumption (SFC) in an aircraft for predetermined thermodynamic cycles of operation having predetermined ranges of air and combustion gas flowrates, temperatures, and pressures in the engine. The cycles are also preselected for maximizing thermal and propulsive efficiency of the engine.

Development of an aircraft gas turbine engine requires a substantial amount of design, development, and testing resulting in substantial development costs. In designing gas turbine engines for M & I applications, it has proved to be more cost effective to modify an existing aircraft gas turbine engine in the desired power class, than to design the M & I engine from the beginning. Accordingly, it is desirable to minimize the changes in the aircraft engine required for obtaining a suitable M & I engine.

One application of an M & I engine is to provide peaking power for powering an electrical generator to provide additional electrical power to a utility power grid when the utility power demands exceed on-line base load capacity. For example, the parent aircraft gas turbine engine may be adapted specifically for driving an electrical generator at a synchronous speed such as 3,000 rpm or 3,600 rpm, for generating electricity at 50 hertz or 60 hertz, respectively. The utility industry desires relatively simple and inexpensive gas turbine engines which can be brought on-line quickly and then shut down quickly as required to meet the peaking requirement. It is also desired to generate the required power during peaking operation as efficiently as possible for reducing kilowatt-hour cost.

One factor in obtaining relatively low kilowatt-hour cost is the development cost for providing an industrial gas turbine engine for meeting the required power demands. In order to keep development costs relatively low, the industrial gas turbine engine typically utilizes a parent aircraft gas turbine engine and makes as few changes as practical in the design thereof. Furthermore, obtaining maximum output shaft horsepower from the engine used for providing peaking power is desirable for maximizing the amount of electrical power generated by the generator for also reducing costs.

An industrial gas turbine engine derived from a dual rotor aircraft turbofan engine for directly driving an electrical generator presents new problems. In a conventional dual rotor aircraft turbofan engine, the two rotors are free to rotate substantially independently of each other and thus provide for improved stall margins of the booster compressor. In the industrial engine, the low pressure turbine (LPT) rotor is required to run at the synchronous generator speed and, therefore, its conventional use in controlling engine operation is no longer available. And, operating flexibility of the engine is narrowed for preventing any undesirable decrease in stall margin of the compressors.

Accordingly, the core engine, or gas generator, speed and the booster compressor variable inlet guide vanes (VIGVs) are the primary means for controlling output shaft horsepower to the generator. In order to obtain maximum possible output shaft horsepower for peaking power applications, the gas generator is operated at a maximum core speed for providing a maximum amount of energy to be extracted by the LPT. The thermodynamic cycle of the engine, therefore, requires maximum core airflow and maximum operating temperatures for obtaining maximum output shaft horsepower from the LPT.

However, operating the engine at maximum output shaft horsepower, also provides a maximum temperature of the high pressure compressor (HPC) discharge air in the core engine. The HPC discharge air is typically used for cooling relatively hot turbine components of the engine, and therefore, the temperature thereof affects the useful life of the cooled components. Whereas increased operating temperatures of the engine are desired for maximizing output shaft horsepower, decreased temperature of the HPC discharge air is desired for obtaining acceptable life of the turbine components.

An engine is typically sized and rated at standard conditions, such as, for example, at sea level at 59° F. (15° C.). At such standard conditions, the maximum output shaft horsepower of the engine may be provided, i.e. rated, which is the maximum value obtainable from that particularly sized engine for obtaining a predetermined useful life thereof.

For example, one dual rotor preexisting aircraft turbofan gas turbine engine has a sea level standard conditions (e.g. 59° F. (15° C.)) rating of about 60,000 pounds (27,216 kilograms) of thrust. In adapting this aircraft turbine engine for powering an electrical generator, the engine derived therefrom has a rating of about 56,000 output shaft horsepower (SHP) at sea level standard conditions (59° F. (15° C.)). However, this particular engine is limited in operation by the temperature (i.e. $T_3$) of the high pressure compressor discharge air. The HPC discharge air temperature $T_3$ has a maximum value; i.e., $T_3^{max}$, at about the 59° F. (15° C.) rating point for obtaining a predetermined useful life of the turbine components thereof. Accordingly, on hot days where the ambient temperature increases beyond about 59° F. (15° C.) up to about 119° F. (48.3° C.), the engine must be operated at output shaft horsepower values correspondingly less than the maximum value at 59° F. (15° C.) for preventing the HPC discharge air temperature $T_3$ from exceeding its maximum permissible value $T_3^{max}$. At an ambient temperature of about 119° F. (48.3° C.), the maximum rated amount of output shaft horsepower from this engine is about 38,000 SHP.

OBJECTS OF THE INVENTION

Accordingly, one object of the present invention is to provide a new and improved gas turbine engine for marine and industrial applications.

Another object of the present invention is to provide a gas turbine engine and method of operation for providing increased output shaft horsepower without increasing high pressure compressor discharge air temperature.

Another object of the present invention is to provide a gas turbine engine derived from an aircraft gas turbine engine requiring relatively few changes for increasing output shaft horsepower therefrom on hot days.

Another object of the present invention is to provide an aircraft derivative, dual rotor gas turbine engine effective for powering an electrical generator at synchronous speed with increased output shaft horsepower and thermal efficiency on hot days without increasing high pressure compressor discharge air temperature.

Another object of the present invention is to provide an aircraft derivative, dual rotor gas turbine engine effective for powering an electrical generator at synchronous speed and obtaining improved stall margin of the high pressure compressor.

DISCLOSURE OF INVENTION

A method of operating a dual rotor gas turbine engine includes bypassing a predetermined portion of compressed airflow from a high pressure compressor to downstream of a high pressure turbine first stage nozzle, and increasing core speed of the engine to a value greater than a reference maximum value for improving a hot day lapse rate curve and increasing output shaft horsepower. The method steps are performed at least at values of ambient air temperature greater than a first value thereof associated with a reference maximum value of output shaft horsepower, and without increasing high pressure compressor discharge air temperature beyond a maximum value thereof associated with the reference maximum value of the output shaft horsepower. The dual rotor, gas turbine engine includes a preexisting design, aircraft derivative core engine including a high pressure compressor and a high pressure turbine first stage nozzle. Means are provided for bypassing a portion of compressed airflow from the high pressure compressor to a point downstream of the high pressure turbine first stage nozzle and increasing core speed for increasing output shaft horsepower of a low pressure turbine without increasing high pressure compressor discharge air temperature beyond a maximum value thereof.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described is the following detailed description taken in conjunction with the accompanying drawing in which:

MODE(S) FOR CARRYING OUT THE INVENTION

Figure 1:
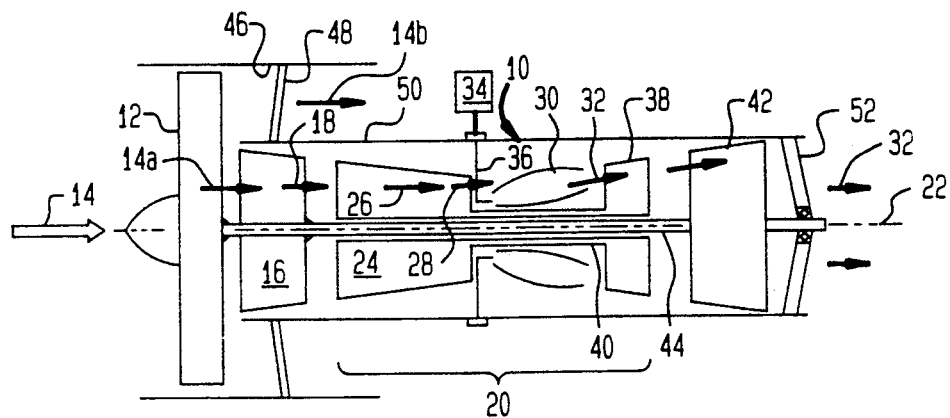
FIG. 1 is a schematic, centerline sectional view of an exemplary prior art aircraft dual rotor turbofan gas turbine engine.

Illustrated in FIG. 1 is an exemplary, prior art, dual rotor, aircraft turbofan gas turbine engine 10 designed for powering an aircraft in flight. The engine 10 is conventional and includes a fan 12 for receiving ambient airflow 14. A first portion 14a of the airflow 14 is channeled to a low pressure compressor (PC), or booster compressor 16, wherein it is initially compressed and then channeled as LPC discharge air 18 to a conventional core engine 20 disposed coaxially about a longitudinal centerline axis 22.

The core engine 20 includes a conventional high pressure compressor (HPC), or core compressor 24 disposed in serial flow communication with the LPC 16 for further compressing the LPC discharge air 18 to generate compressed airflow 26 which is discharged from the HPC 24 as HPC discharge air 28 having a relative maximum pressure. The core engine 20 further includes a conventional annular combustor 30 disposed in serial flow communication with the HPC 24 for receiving the HPC discharge air 28 and fuel for generating combustion gases 32. A conventional fuel supply means 34 selectively provides fuel to a plurality of circumferentially spaced fuel injectors 36 for adding fuel to the discharge air 28 for generating the combustion gases 32. The core engine 20 further includes a conventional high pressure turbine (HPT) 38 disposed in serial flow communication with the combustor 30 for receiving the combustion gases 32 and extracting energy therefrom. A high pressure (HP), or core, shaft 40 fixedly joins the HPT 38 to the HPC 24 for rotating the HPC at a core speed $N_{25}$.

Disposed downstream from the core engine 20 and in serial flow communication therewith is a conventional low pressure turbine (LPT) 42 for channeline the combustion gases 32 from the HPT 38 for further extracting energy therefrom. The LPT 42 is operatively fixedly connected to both the LPC 16 and the fan 12 through a low pressure (LP) shaft 44 for rotating the LPC 16 and the fan 12 at a rotor speed $N_2$.

A radially outer, second portion 14b of the ambient airflow 14 is channeled from the fan 12 through a conventional bypass duct 46 for providing thrust for propelling an aircraft in flight. The bypass duct 46 is conventionally supported through a plurality of circumferentially spaced struts 48 fixedly connected to an annular casing 50 surrounding the LPC 16 and the core engine 20. The casing 50 extends axially downstream over the LPT 42, and the LPT 42 is conventionally supported at its aft end to the casing 50 through a plurality of circumferentially spaced conventional turbine rear frame struts 52. The casing 50 typically includes several axial casings bolted together along the engine for ease in disassembly of component modules. A conventional conic nozzle or low area ratio converging-diverging nozzle (not shown) is typically used to generate thrust from the core flow discharged from the LPT 42.

Since the engine 10 is provided for a particular aircraft application, it is an existing aircraft engine design having predetermined design flowrate, temperature, and pressure characteristics throughout the engine for operating over various output power requirements ranging from low output power at engine idle, to intermediate output power at cruise operation of the engine, and at maximum power at takeoff of the aircraft. The engine 10, therefore, is predeterminedly designed for operating over a range of output power and for minimizing specific fuel consumption (SFC) by providing relatively high, or maximized thermal and propulsive efficiency of the engine. The exemplary engine 10 typically operates over a range of rotor speed, for example, the LP shaft 44 operates at speeds $N_2$ ranging from about 780 rpm to about 3,700 rpm, and the HP shaft 40 operates at speeds $N_{25}$ from about 6,150 rpm to about 10,850 rpm, corresponding with idle and maximum thrust operation of the engine 10. The maximum thrust generated from this preexisting, exemplary dual rotor (shaft) engine 10 is about 60,000 pounds (27,216 kilograms) of thrust.

Accordingly, the engine 10 is designed for various design points of operation associated with particular speeds of the shafts 40 and 44. For example, for a particular speed $N_2$ of the LP shaft 44, and for a corresponding particular speed $N_{25}$ of the HP shaft 40, the core engine 20 provides the combustion gases 32 to the LPT 42 at predetermined, flowrate (either represented by mass flowrate or weight flowrate $W_{49}$), temperature ($T_{49}$), and pressure ($P_{49}$). These predetermined design characteristics of the core engine 20 and the LPT 42 are selected, for example, for particular design point operation based on conventional considerations, including desired output power, thermal efficiency of the engine 10, and preferred stall margins for the LPC 16 and the HPC 24.

Figure 2:
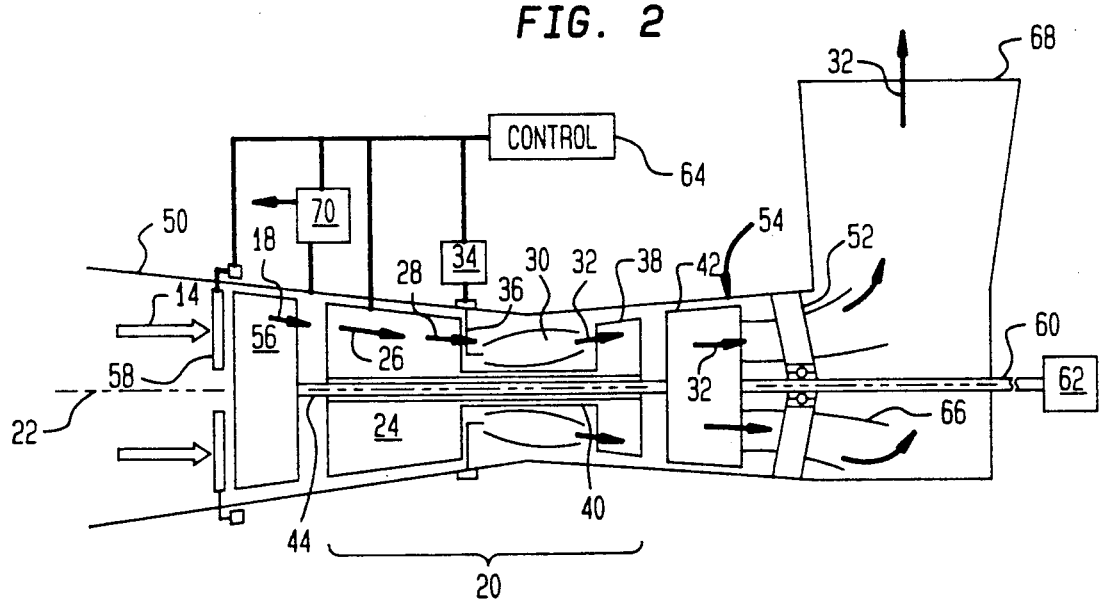
FIG. 2 is a schematic, centerline sectional view of a gas turbine engine derived from the aircraft engine illustrated in FIG. 1 in accordance with one embodiment of the present invention.

Illustrated in FIG. 2 is a gas turbine engine 54 in accordance with one embodiment of the present invention, which is derived from the preexisting engine 10 illustrated in FIG. 1, and therefore is referred to is the derivative engine 54. The derivative engine 54 is provided by removing the fan 12 and the LPC 16 from the aircraft engine 10 illustrated in FIG. 1 and substituting therefor a conventionally modified low pressure compressor (LPC), or booster compressor 56. The LPC 56 includes a plurality of conventional, circumferentially spaced variable inlet guide vanes (VIGVs) 58 which selectively control the amount of airflow 14 channeled through the LPC 56. In alternate embodiments of the invention, fixed inlet guide vanes could also be used. Except as described hereinbelow, the derivative engine 54 utilizes the same core engine 20 and LPT 42 as utilized in the aircraft engine 10 for reducing the number of changes required for providing the derivative engine 54.

The derivative engine 54 includes, in accordance with one embodiment of the present invention, an output shaft 60 which extends, for example, in an aft direction from the LPT 42, with the output shaft 60 being conventionally fixedly secured to the LPT 42 for rotation therewith, and for rotation with the LP shaft 44 at the speed $N_2$. The output shaft 60 is conventionally attached to a conventional electrical generator 62 which is conventionally connected to a power grid of an electrical utility for providing electrical power at a synchronous frequency of 60 hertz, for example. The output shaft 60 could alternatively extend out the front of the LPC 56 to a forward placed electrical generator 62.

In order to obtain the preferred 60 hertz electrical frequency, the output shaft 60 is conventionally operated at a predetermined, constant value of the speed $N_2$ of 3,600 rpm, also referred to as synchronous speed. Other frequencies may be obtained in other embodiments, such as 50 hertz at 3,000 rpm. A conventional engine control 64 is suitably connected to the derivative engine 54 for controlling its operation. For example, the control 64 is suitably connected to the fuel supply means 34 for controlling the amount of fuel provided to the combustor 30, to the VIGVs 58 for controlling their relative open and closed position, and to conventional variable nozzle vanes of the HPC 24, as disclosed in more detail below. Once the generator 62, and therefore the engine 54 is conventionally locked into the electrical grid, the rotational speed of the output shaft 60 and LP shaft 44 is held magnetically by the grid at the preferred synchronous speed.

In this exemplary application for driving the generator 62, the derivative engine 54 also includes a conventional radial diffuser 66 for diffusing the combustion gases 32 discharged from the LPT 42 which are then channeled to the atmosphere by a conventional exhaust collector 68.

Figure 3:
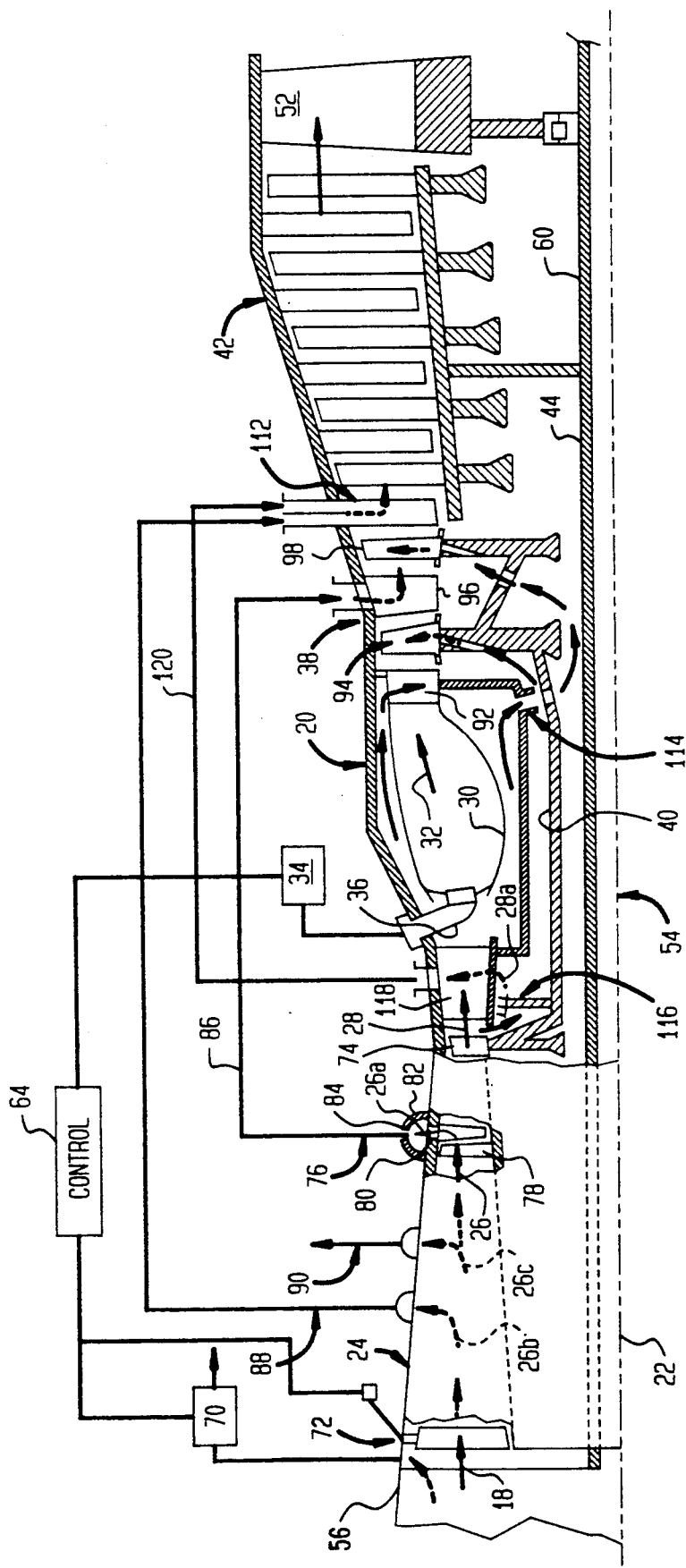
FIG. 3 is an enlarged, schematic, partly sectional centerline view of the engine illustrated in FIG. 2.

Illustrated in FIG. 3 in more particularity is the derivative engine 54. The engine 54 further includes conventional variable bleed valves (VBVs) 70 conventionally joined to the engine control 64 for predeterminedly varying the amounts of bleed overboard of the LPC discharge air 18 from the LPC 56 for controlling stall margin thereof.

The conventional HPC 24 is an axial flow compressor having a plurality of compressor stages including a conventional variable HPC first stage nozzle 72 operatively connected to the engine control 64 for controlling the speed of the HPC 24 for best efficiency for the amount of LPC discharge air 18 channeled into the HPC 24. The HPC 24 also includes an HPC last stage rotor 74 from which is discharged the HPC discharge air 28 at a temperature $T_3$. In this exemplary embodiment of the invention, the HPC 24 includes 14 compressor stages with each comprising a conventional HPC nozzle (or stator) disposed upstream of a conventional HPT rotor, such as the nozzle 72 and the rotor 74.

Shown in the central cutaway portion of the HPC 24 is a substantially conventional, except as configured for the present invention as described hereinbelow, bypass or bleed means 76, which in this exemplary embodiment, is the 11th stage bleed 76. A portion 26a of the compressed airflow 26 is conventionally bled downstream from an HPC 11th stage rotor 78 through a plurality of circumferentially spaced conventional bleed ports 80 into a conventional annular bleed manifold 82. A bleed orifice 84 predeterminedly controls the amount of the bleed air 26a discharged from the manifold 82 through a bleed conduit 86. The HPC 24 further includes conventional 7th stage bleed means 88 and 8th stage bleed means 90 as described further hereinbelow.

The exemplary HPT 38 includes a conventional HPT first stage nozzle 92, or diaphragm, conventionally joined to the downstream end of the combustor 30 for receiving the combustion gases 32. The HPT 38 also includes a conventional HPT first stage rotor 94 which is conventionally fixedly joined to the HP shaft 40 for driving the HPC 24. In this exemplary embodiment of the present invention, the HPT 38 is a two stage turbine and further includes a conventional HPT second stage nozzle 96 disposed downstream of the first stage rotor 94 followed in turn by a conventional HPT second stage rotor 98. The second stage rotor 98 is also conventionally fixedly joined to the first stage rotor 94 and the HP shaft 40 for rotation therewith.

As used herein, these various compressor and turbine nozzles and rotors conventionally include respective pluralities of circumferentially spaced stationary stator vanes, and circumferentially spaced rotor blades. The vanes the HPT first and second stage nozzles 92 and 96 conventionally direct the combustion gases 32 through the respective blades of the first and second stage rotors 94 and 98. Energy is extracted from the combustion gases 32 for rotating the first and second stage rotors 94 and 98 and, therefore, the HP shaft 40 for driving the HPC 24.

Figure 4:
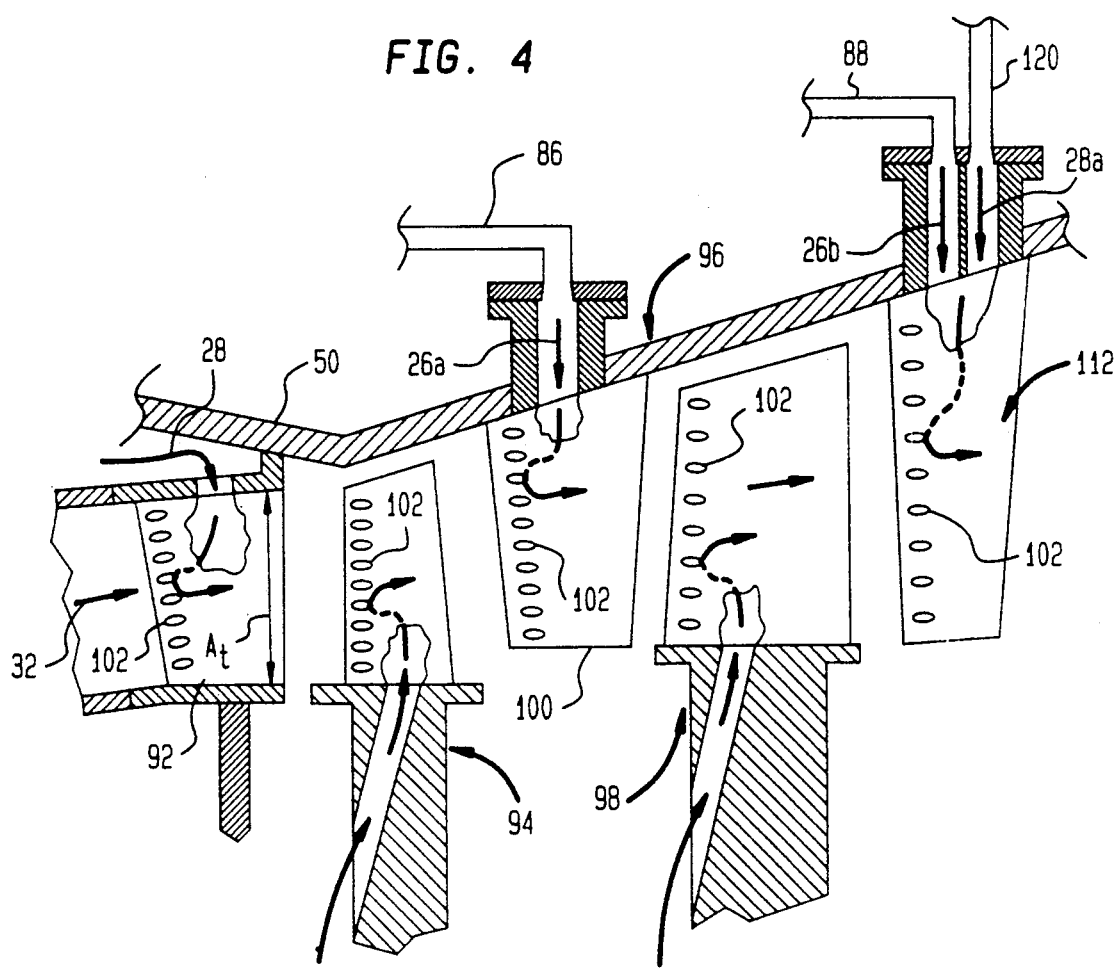
FIG. 4 is a schematic, partly sectional longitudinal view of a portion of the high pressure turbine illustrated in FIG. 3.

For example, the HPT second stage nozzle 96 includes a plurality of conventional, circumferentially spaced hollow vanes 100 as illustrated in more particularity in FIG. 4. The vanes 100 include a plurality of radially spaced cooling apertures 102, only some of which are shown, through which the 11th stage bleed air 26a is channeled from the conduit 86 and through the inside of the vanes 100 for conventionally cooling the second stage nozzle 96.

Referring again to FIGS. 3 and 4, along with FIG. 5, the derivative engine 54, except in accordance with the invention as described hereinbelow, may be conventionally operated so that the core engine 20 is effective for providing the combustion gases 32 to the LPT 42 at a reference value of the core speed $N_{25}^{ref}$ (about 10,235 rpm for the exemplary engine described above) for obtaining a reference maximum value of horsepower $SHP_1$ from the output shaft 60 at a first, or standard day value $T_2^s$ of the ambient air temperature $T_2$ and at a maximum value $T_3^{max}$ of the HPC discharge air temperature $T_3$. The exemplary derivative engine 54, but for the present invention, is $T_3$ limited in that it may not be operated for obtaining horsepower greater than the reference maximum value SHP without increasing the HPC discharge air temperature $T_3$ to unacceptable values beyond $T_3^{max}$ which would decrease the useful life of the turbine components conventionally cooled by the HPC discharge air 28.

Figure 5:
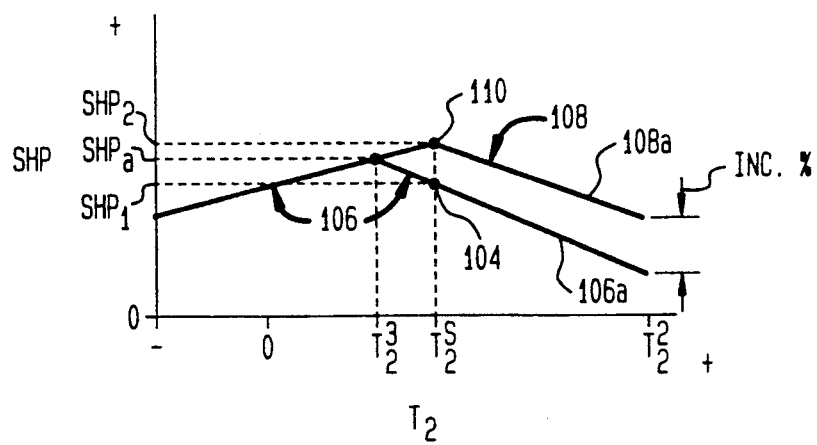
FIG. 5 is a graph plotting output shaft horsepower (SHP) versus ambient air temperature ($T_2$).

More specifically, illustrated in FIG. 5 is a graph plotting output shaft horsepower (SHP) of the output shaft 60 versus the temperature $T_2$ of the ambient airflow 14. Since the core engine 20 and the LPT 42 are from a preexisting engine; i.e., the aircraft engine 10, they may be conventionally operated for producing output shaft horsepower up to a maximum rated value; i.e., the reference standard day maximum value $SHP_1$ indicated at point 104 in the graph. The reference maximum horsepower $SHP_1$ is one point on the conventionally known (reference) lapse rate curve 106 and occurs at the standard value $T_2^s$ of the ambient airflow temperature $T_2$, which in the exemplary embodiment is 59° F. (15° C.). As the ambient air temperature $T_2$ increases from the standard temperature, i.e. $T_2^s$, 59° F. (15° C.) up to a second value $T_2^2$ of about 119° F. (48.3° C.), which occurs on hot days, the output shaft horsepower SHP would be necessarily conventionally reduced from the reference maximum value $SHP_1$ in order to prevent the HPC discharge air temperature $T_3$ from exceeding the maximum value $T_3^{max}$, which would decrease the useful life of the engine 54. For obtaining the reference maximum output shaft horsepower $SHP_1$, the core speed $N_{25}$ is also at the reference value $N_{25}^{ref}$ for providing the combustion gases 32 to the LPT 42 at reference mass or weight flowrate $W_{49}^{ref}$, reference temperature $T_{49}^{ref}$, and reference pressure $P_{49}^{ref}$.

In the exemplary embodiment of the present invention, the preexisting core engine 20 and LPT 42 are effective for obtaining the reference lapse rate curve 106 which has an absolute maximum output shaft horsepower $SHP_a$, greater than the standard day rated maximum $SHP_1$ occurring at a third value $T_2^3$ of the ambient air temperature $T_2$ of about 50° F. (1020 C.), which is less than the standard temperature $T_2^s$. Nevertheless, the portion of the reference lapse rate curve 106 at ambient air temperatures $T_2$ including ambient air temperatures $T_2$ greater than and equal to the standard temperature $T_2^s$ is defined herein as the reference hot day lapse rate curve 106a. In the exemplary reference lapse rate curve 106, the reference hot day lapse rate curve 106a extends from the standard temperature $T_2^s$ at least to the second value $T_2^2$.

In accordance with the present invention, means, as described hereinbelow, are provided for improving the hot day lapse rate curve by moving it higher or greater than the reference hot day lapse rate curve 106a, for increasing output shaft horsepower. For example, the output shaft horsepower is increased at values of the ambient airflow temperature $T_2$ greater than the standard value $T_2^s$ without increasing the HPC discharge air temperature $T_3$ beyond the maximum temperature thereof. In accordance with the invention, the derivative engine 54 has an improved lapse rate curve 108 as illustrated in FIG. 5 which has increased values of output shaft horsepower SHP for values of the ambient airflow $T_2$ equal to and greater than $T_2^s$, including a new maximum value $SHP_2$ indicated at point 110, which is greater than the reference maximum value $SHP_1$ at point 104. The lapse rate curve 108 includes an improved hot day lapse rate curve 108a defined herein as those output shaft horsepower values SHP for hot days at ambient air temperatures $T_2$ greater than and equal to the standard temperature $T_2^s$.

A new method of operating the derivative engine 54 in accordance with the present invention includes bypassing a predetermined portion of the compressed airflow 26, as illustrated in FIG. 3, from the HPC 24 to a position downstream of the HPT first stage nozzle 92 while increasing the core speed $N_{25}$ to a value greater than the reference value thereof ($N_{25}^{ref}$) for improving the hot day lapse rate curve (i.e. 108a) greater than the reference hot day lapse rate curve 106a for increasing output shaft horsepower. These steps are also effective for increasing the output shaft horsepower greater than the reference maximum value thereof. The compressed airflow bypassing step and the core speed increasing step are preferably performed at least at values of the ambient airflow temperature $T_2$ greater than and equal to the standard value $T_2^s$ thereof, and without increasing the HPC discharge air temperature $T_3$ beyond the maximum value thereof ($T_3^{max}$) associated with the reference maximum output shaft horsepower $SHP_1$ (point 104 in FIG. 5) for increasing the output shaft horsepower above the reference maximum value $SHP_1$.

In the graph illustrated in FIG. 5, the improved hot day lapse rate curve 108a has output shaft horsepower SHP values greater than those for the reference hot day lapse rate curve 106a at all values of the ambient air temperature $T_2$ from the standard value $T_2^s$ to the second value $T_2^2$. Furthermore, the improved lapse rate curve 108 has greater values of SHP compared to the reference curve 106 from the second value $T_2^s$ down to the third value $T_2^3$.

In one embodiment of the present invention, relatively low-energy compressor airflow 26 is bypassed around the HPT first stage nozzle 92, and the core speed $N_{25}$ is further increased on hot days wherein the ambient temperature $T_2$ is greater than the standard value thereof ($T_2^s$). Accordingly, the temperature of the combustion gases 32 discharged from the combustor 30 will correspondingly increase and the flowrate $W_{49}$, temperature $T_{49}$, and pressure $P_{49}$ of the combustion gases 32 channeled to the LPT 42 will also increase over the reference values thereof (i.e. $W_{49}{}^{ref}$, $T_{49}{}^{ref}$, and $P_{49}{}^{ref}$) which will cause the LPT 42 to extract more energy therefrom and generate the increased values of output shaft horsepower shown in lapse rate curve 108 of FIG. 5 at a given HPC discharge air temperature $T_3$ (e.g. $T_3{}^{max}$).

The HPC compressed airflow 26 bypassing step will reduce the HPC discharge air temperature $T_3$ since less compressed airflow 26 is being provided to the HPT first stage nozzle 92. It should be recognized, that the HPT designated $A_t$, as illustrated in FIG. 4, which is predetermined since the core engine 20 being used is a preexisting design. The throat area $A_t$ was conventionally designed for channeling therethrough only a predetermined amount of the combustion gases 32. The throat area $A_t$ directly affects the HPC discharge air temperature $T_3$, with the temperature $T_3$ increasing directly as the flowrate of the combustion gases 32 is increased through the HPT first stage nozzle 92. The output shaft horsepower of the derivative engine 54 could be conventionally increased beyond the reference maximum value at point 104 without increasing $T_3{}^{max}$ by simply providing a new HPT first stage nozzle having an increased throat area $A_t$. However, this would be a relatively expensive solution to the hot day lapse rate degradation performance which would also require additional changes to the remainder of the HPT 38 in order to solve rotor thrust balance changes.

Accordingly, by bypassing a predetermined portion of the compressed airflow 26 around the HPT first stage nozzle 92, the HPC discharge temperature $T_3$ may be reduced so that the output shaft horsepower may be increased.

Correspondingly, the core speed $N_{25}$ is increased as above described for increasing the energy of the combustion gases 32 channeled to the LPT 42 for increasing the maximum value of the output shaft horsepower therefrom. The HPC compressed airflow bypassing step reduces the HPC discharge air temperature $T_3$ preferably at least as much as the core speed increasing step increases the HPC discharge air temperature $T_3$ so that the HPC discharge air temperature $T_3$ does not increase beyond the maximum value thereof ($T_3{}^{max}$). In this way, increased output shaft horsepower may be obtained from the derivative engine 54 without substantial structural changes thereto and without increasing the maximum value of the HPC discharge air temperature $T_3$ for maintaining acceptable life of the derivative engine 54, including the turbine components thereof conventionally cooled by the HPC discharge air 28.

Referring again to FIGS. 3 and 4, the improved method of the present invention may be practiced by providing additional HPC bleed or bypass means, or, preferably by using any available HPC bleed or cooling flows to bypass the HPT first stage nozzle 92. Preferred sources of the bypass airflow are the earlier stages of the HPC 24 in which less energy has been expended for compressing the compressed airflow 26, although any source between the first and last stage rotors of the HPC 24 may be used. Preferred sinks for the bypassed airflow include any sink disposed downstream of the HPT first stage nozzle 92 including the first and second stage HPT rotors, the HPT second stage nozzle, and any of the LPT stage nozzles or rotors. Preferred sinks also include those disposed upstream of the LPT 42 so that some of the energy contained in the compressed airflow 26 may be recaptured in the LPT 42.

It should be recognized that the conventionally available HPC bleed or cooling airflows are parasitic airflows since any of the compressed airflow 26 not directly used for generating the combustion gases 32 necessarily decreases the overall efficiency of the engine. Accordingly, conventional practice is to minimize the amount of the compressed airflow 26 removed from the HPC 24 for cooling purposes. However, in accordance with the present invention, these parasitic cooling airflows may be used to advantage by predeterminedly increasing the amounts of such flows in conjunction with increasing the core speed $N_{25}$ as described above for increasing the output shaft horsepower on hot days. Any decrease in efficiency of the engine 54 may be considered secondary to providing increased output shaft horsepower for the peaking power requirements of the electrical generator 62 while not exceeding the HPC discharge air maximum temperature $T_3{}^{max}$ for obtaining acceptable life of the engine 54.

In one preferred embodiment of the present invention, the 11th stage bypass means 76 is preferably sized for increasing the amount of HPC bleed air 26a, as shown in FIG. 4, channeled through the conduit 86 to the HPT second stage nozzle 96. This may be accomplished simply by increasing the flow area of the bleed orifices 84.

Correspondingly, with the increased 11th stage bypass airflow 26a, the engine control 64 is conventionally configured for increasing the core speed $N_{25}$ to a value greater than the reference value thereof ($N_{25}{}^{ref}$) for increasing the output shaft horsepower. For example, the engine control 64 will increase the amount of fuel provided by the fuel supply means 34 to the fuel injectors 36 and into the combustor 30 for increasing the core speed $N_{25}$ past the reference core speed $N_{25}{}^{ref}$. Accordingly, the flowrate $W_{49}$, temperature $T_{49}$, and pressure $P_{49}$ of the combustion gases 32 provided to the LPT 42 are increased beyond their reference values for providing more energy to be extracted by the LPT 42.

Provided below is a table including analytically determined values showing performance of the exemplary derivative engine 54. The table is based on a constant value of the HPC discharge air temperature $T_3$, i.e., the maximum reference value thereof ($T_3{}^{max}$), and an LP shaft speed $N_2$ of 3,600 rpm for providing 60 hertz electrical power from the generator 62. The table is also based on sizing the 11th stage bypass means 76 for obtaining a 4% increase in maximum bypass airflow 26a, relative to conventional operation, to the HPT second stage nozzle 96.

TABLE

| °F./°C. $T_2$ | % $\Delta N_{25}$ | % $\Delta SHP$ | % $\Delta EFF.$ | °F./°C. $\Delta T_{41}$ | % $\Delta W_{49}$ |
|---|---|---|---|---|---|
| 59/15 | +0.46 | +8.2 | +0.2 | +118/65-.6 | +1.2 |
| 79/26.1 | +0.63 | +12.4 | +0.5 | +124/68-.8 | +2.6 |
| 99/37.2 | +0.61 | +11.3 | +1.0 | +109/60-.5 | +2.5 |
| 119/48.3 | +0.60 | +12.9 | +1.7 | +112/62-.2 | +2.6 |

| °F./°C. $\Delta T_{49}$ | % $\Delta P_{49}$ | % $\Delta LPC$ | % $\Delta HPC$ | LB/SEC (Kg/SEC) $\Delta VBV$ |
|---|---|---|---|---|
| +79/43.8 | +3.1 | +0.3 | +4.3 | 0 |
| +84/46.6 | +4.6 | +0.3 | +4.3 | −0.5 (−0.2) |

TABLE-continued

| +72/40.0 | +4.0 | +2.0 | +4.3 | −5.5 (−2.2) |
|---|---|---|---|---|
| +75/41.6 | +4.2 | +1.5 | +3.6 | −5.3 (−2.4) |

The table indicates about an 8.2% increase in output shaft horsepower SHP to about a 12.9% increase thereof on hot days corresponding to ambient temperatures $T_2$ from 59° F. to 119° F., respectively. These values indicate an improved, increase in SHP, as well as an improved, decrease in the actual lapse rate itself. These values were used for plotting the improved lapse rate curve 108 in FIG. 5 with the first, or standard day, value $T_2^5$ of the ambient airflow temperature $T_2$ being 59° F. (15° C.), the second value $T_2^2$ being 119° F. (48.3° C.), and the third value of the ambient airflow temperature $T_2^3$ being 50° F. (10° C.). The table shows that for a 4% increase in bypass airflow 26a through the 11th stage bypass means 76 to the HPT second stage nozzle 96 and increase in core speed $N_{25}$, output shaft horsepower SHP is substantially increased for hot day ambient temperatures $T_2$ from 59° F. (15° C.) to at least 119° F. (48.3° C.), as well as down to the third value of the ambient airflow temperature $T_2^3$ of about 50° F. (10° C.).

The table also indicates that there has been a net increase in thermal efficiency ($\Delta$EFF.) of the engine 54 in the temperature range of the table. However, increase in thermal efficiency may not typically be expected for other derivative gas turbine engines nor is it a primary objective. The temperature of the combustion gases 32 discharged from the combustor 30 have increased on the order of about 115° F. (about 64° C.) as indicated in the column $\Delta T_{41}$. The temperature of the combustion gases 32 has been increased by increasing the core speed $N_{25}$ and the energy in the combustion gases 32 within the combustor 30. As a result thereof, the combustion gases 32 are channeled to the LPT 42 at increased flowrate ($\Delta W_{49}$), increased temperature ($\Delta T_{49}$), and increased pressure ($\Delta P_{49}$) as compared to the reference values of the flowrate, temperature, and pressure ($W_{49}^{ref}$, $T_{49}^{ref}$, $P_{49}^{ref}$) obtained without the increased bypass airflow from the 11th stage bypass means 76 or the increased core speed $N_{25}$.

A significant advantage of the present invention, is that the bypass means 76 and the increased core speed $N_{25}$ are effective for increasing the stall margin of the HPC 24 as indicated by the column labeled $\Delta$HPC. The table indicates that the HPC stall margin is increased about 1% for each 1% increase of the compressed airflow bypassed by the bypass means 76.

Similarly, the stall margin of the LPC 24 has been improved slightly as indicated by the column labeled $\Delta$LPC.

An additional advantage of the present invention is that the amount of LPC discharge air 18 bled overboard by the VBVs 70 may be substantially reduced as indicated by the column labeled $\Delta$VBV. The VBVs 70 are conventionally used for controlling stall margin of the LPC 56, and the reduced amount of bleed air dumped therefrom is substantial for further increasing thermal efficiency of the derivative engine 54.

Another advantage, is that the horsepower required to drive the LPC 56 is reduced due in large part to the increase in core speed $N_{25}$, which reduces the load on the LPT 42 and increases the stall margin of the LPC 56. Therefore, power otherwise required to run the LPC 56 is channeled through the output shaft 60 to drive the generator 62.

As described above, it is preferred to use existing, conventional parasitic bleed and cooling airflow structures from the parent engine 10 with suitable modifications for increasing the amount of flows therefrom for use in conjuction with the increased core speed $N_{25}$ for obtaining increased output shaft horsepower SHP without increasing the maximum HPC discharge air temperature $T_3^{max}$.

Instead of or in addition to the use of the 11th stage bypass means 76 described above, the conventional 7th stage bleed means 88 which channels a portion stage bleed airflow 26b, of the compressed airflow 26 to the LPT first stage nozzle 112 may also be used. The LPT first stage nozzle 112 is shown in FIG. 3, and in more particularity, in FIG. 4. The LPT first stage nozzle 112 is similar to the HPT second stage nozzle 96 and includes 26b, is channeled and discharged through similar cooling apertures 102. The 7th stage bleed means 88 would also be configured for obtaining increased bypass flow therethrough relative to that which would be obtained therein in the conventional engine 10, by simply increasing the size of the flow passages thereof.

Yet another additional, or alternate source for bypassing the compressed airflow 26 is the 8th stage bleed means 90 conventionally found in the core engine 20. It too could be sized for increasing the amount of the compressed airflow 26 bled therethrough, i.e. 8th stage bleed airflow 26c, and dumped overboard. However, gains in the improved hot day lapse rate curve 108a would be relatively small. Since the compressed airflow is dumped overboard from the bleed means 90 it is not channeled through any turbine stages as required in accordance with the preferred embodiment of the present invention. Therefore, it is not available for recapturing energy therefrom in any turbine stage in this embodiment of the invention.

As illustrated in FIGS. 3 and 4, the core engine 20 includes a conventional mini-nozzle assembly 114 disposed at the downstream end of the combustor 30 which receives a portion of the HPC discharge air 28 and channels it to the HPT first and second stage rotors 94 and 98 wherein it is channeled into the hollow blades thereof and out additional conventional cooling apertures 102 therein for cooling the HPT first and second stage rotors 94 and 98 in a conventional fashion. In accordance with the present invention, the mini-nozzle assembly 114 could also be sized for predeterminedly increasing the amount of the HPC discharge airflow 28 channeled therethrough which also bypasses the HPT first stage nozzle 92 for practicing the present invention.

The core engine 20 further includes a conventional, but for the present invention, CDP (compressor discharge pressure) seal 116 disposed immediately downstream of the HPC last stage rotor 74 and a conventional diffuser 118 which diffuses the HPC discharge air 28 into the combustor 30. The CDP seal 116 maintains a forwardly directed axial thrust force on the HPC last stage rotor 74 for conventional thrust balancing purposes, and, therefore, leakage past the CDP seal 116 is preferably small. The leakage airflow portion of the HPC discharge air 28, designated 28a, is conventionally channeled through the hollow struts of the diffuser 118 and through a conduit 120 to the LPT first stage nozzle 112 (conventionally referred to as HP recoup air). Accordingly, in accordance with the present invention, the CDP seal 116 may have a predeterminedly larger gap therein for increasing the amount of leakage airflow 28a for additionally bypassing a portion of the HPC discharge air 28 around the HPT first stage nozzle 92.

As mentioned above, separate conventional bypass or bleed means may also be provided solely for purposes of the present invention to bypass HPC compressed airflow 26, with the conventional means 76, 88, 90, 114 and 116 being unaltered from the present core engine 20. Such conventional bypass and bleed means may take the same form as the bypass means 76, 88, and 90 for bypassing HPC compressed airflow 26 from the various sources to the various sinks described above.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A method of operating a dual rotor gas turbine engine having:
    a low pressure compressor (LPC) for compressing ambient air having a temperature $T_2$ and driven by a low pressure turbine (LPT), said LPT providing horsepower to drive a load through an output shaft at a substantially constant rotor speed;
    a preexisting design core engine derived from an aircraft gas turbine engine including a high pressure compressor (HPC) for generating HPC discharge air at a temperature $T_3$, a combustor for generating combustion gases, and a high pressure turbine (HPT) having an HPT first stage nozzle and an HPT first stage rotor driving said HPC at a core speed; and
    said core engine being effective for providing said combustion gases to said LPT at a reference value of said core speed for obtaining a reference hot day lapse rate curve including a reference maximum value of said horsepower from said output shaft at a first value of said ambient air temperature $T_2$ and at a maximum value of said HPC discharge air temperature $T_3$;
    said method comprising:
    bypassing a predetermined portion of compressed airflow from said HPC to downstream of said HPT first stage nozzle; and
    increasing said core speed to a value greater than said reference value thereof for improving said hot day lapse rate curve for increasing horespower at said output shaft; and
    performing said compressed airflow bypassing step and said core speed increasing step at least at values of said ambient air temperature $T_2$ greater than and equal to said first value thereof and without increasing said HPC discharge air temperature $T_3$ beyond said maximum value thereof.

2. A method according to claim 1 wherein said compressed airflow bypassing step and said core speed increasing step are effective for increasing horsepower at said output shaft greater than said reference maximum value thereof.

3. A method according to claim 2 wherein said core speed increasing step increases flowrate, temperature, and pressure of said combustion gases provided to said LPT from said core engine.

4. A method according to claim 3 wherein said HPC compressed airflow bypassing step reduces said HPC discharge air temperature $T_3$ at least as much as said core speed increasing step increases said HPC discharge air temperature $T_3$ so that said HPC discharge air temperature $T_3$ does not increase beyond said maximum value thereof.

5. A method according to claim 4 wherein said HPC compressed airflow bypassing step and said core speed increasing step increase stall margin of said HPC.

6. A method according to claim 4 wherein said HPC compressed airflow bypassing step includes bypassing a portion of said predetermined portion of compressed airflow from between a first stage and a last stage of said HPC.

7. A method according to claim 4 wherein said HPC compressed airflow bypassing step includes bypassing a portion of said HPC discharge air from said HPC to downstream of said HPT first stage nozzle.

8. A method according to claim 4 wherein said HPC compressed airflow bypassing step and said core speed increasing step increase thermal efficiency of said engine.

9. A method according to claim 4 wherein said HPC compressed airflow bypassing step and said core speed increasing step increase step margin of said LPC.

10. A method according to claim 9 wherein said LPC includes variable bleed value )VPVs) for bleeding overboard a predetermined amount of discharge air from said LPC, and said HPC compressed airflow bypassing step and said core speed increasing step reduces bleed overboard from said VBVs.

11. A method according to claim 1 wherein said HPC compressed airflow bypassing step and said core speed increasing step decrease the slope of said reference hot day lapse rate curve while increasing horsepower at said output over values thereof in said reference hot day lapse rate curve.

12. A gas turbine engine for powering a load comprising:
    a low pressure compressor (LPC) for compressing ambient air having a temperature $T_2$ to generate LPC discharge air;
    a core engine including:
        a high pressure compressor (HPC) disposed in flow communication with said LPC for compressing said LPC discharge air to generate HPC discharge air having a temperature $T_3$;
        a combustor disposed in flow communication with said HPC for receiving said HPC discharge air and fuel for generating combustion gases;
        a high pressure turbine (HPT) including an HPT first stage nozzle disposed in flow communication with said combustor for channeling said combustion gases to an HPT first stage rotor for extracting energy therefrom; and
        a core shaft fixedly joining said HPT first stage rotor to said HPC for rotating said HPC at a core speed;
    a low pressure turbine (LPT) including an LPT first stage nozzle disposed in flow communication with said HPT for channeling said combustion gases to an LPT first stage rotor for further extracting energy therefrom;

a low pressure (LP) shaft fixedly joining said LPT first stage rotor to said LPC for rotating said LPC at a rotor speed;

an output shaft fixedly joining said load to said LPT for providing output shaft horsepower to drive said load at a substantially constant value of said rotor speed;

said core engine being a preexisting design derived from an aircraft gas turbine engine and being effective for providing said combustion gases to said LPT at a reference value of said core speed for obtaining a reference hot day lapse rate curve including a reference maximum value of said output shaft horsepower at a first value of said ambient air temperature $T_2$ and at a maximum value of said HPC discharge air temperature $T_3$; and means for improving said hot day lapse rate curve for increasing said output shaft horsepower.

13. A gas turbine engine according to claim 12 wherein said hot day lapse rate curve improving means is effective for increasing said output shaft horsepower at values of said ambient air temperature $T_2$ greater than said first value thereof without increasing said HPC discharge air temperature $T_3$ beyond said maximum value thereof.

14. A gas turbine engine according to claim 13 wherein said output shaft horsepower increasing means comprises:

means for bypassing a predetermined portion of compressed airflow from said HPC to downstream of said HPT first stage nozzle;

means for increasing said core speed to a value greater than said reference value thereof for increasing said output shaft horsepower greater than said reference maximum value thereof; and said bypassing means and said core speed increasing means being operable at least at values of said ambient air temperature $T_2$ greater than said first value thereof and without increasing said HPC discharge air temperature $T_3$ beyond said maximum value thereof.

15. A gas turbine engine according to claim 14 wherein said core speed increasing means is effective for increasing flowrate, temperature, and pressure of said combustion gases provided to said LPT from said core engine.

16. A gas turbine engine according to claim 15 wherein said bypassing means is effective for reducing said HPC discharge air temperature $T_3$ at least as much as said core speed increasing means increases said HPC discharge air temperature $T_3$ so that said HPC discharge air temperature $T_3$ does not increase beyond said maximum value thereof.

17. A gas turbine engine according to claim 16 wherein said bypassing means and said core speed increasing means are effective for increasing stall margin of said HPC.

18. A gas turbine engine according to claim 16 wherein said bypassing means is effective for bypassing said predetermined portion of compressed airflow from between a first stage rotor and a last stage rotor of said HPC.

19. A gas turbine engine according to claim 16 wherein said bypassing means is effective for bypassing said HPC discharge air from a last stage of said HPC.

20. A gas turbine engine according to claim 16 wherein said bypassing means is effective for bypassing said predetermined portion of compressed airflow from said HPC to an HPT second stage nozzle disposed downstream of said HPT first stage rotor for cooling said HPT second stage nozzle.

21. A gas turbine engine according to claim 16 wherein said bypassing means is effective for bypassing said predetermined portion of compressed airflow from said HPC to an HPT second stage rotor disposed downstream of said HPT first stage rotor for cooling said HPT second stage rotor.

22. A gas turbine engine according to claim 16 wherein said bypassing means is effective for bypassing said predetermined compressed airflow from said HPC to a first stage nozzle of said LPT disposed downstream of said HPT for cooling said LPT first stage nozzle.

23. A gas turbine engine according to claim 16 wherein said bypassing means is effective for bypassing said predetermined portion of compressed airflow from between a first stage rotor and a last stage rotor of said HPC and to an HPT second stage nozzle disposed downstream of said HPT first stage rotor for cooling said HPT second stage nozzle.

24. A gas turbine engine according to claim 23 wherein said bypassing means and said core speed increasing means are effective for increasing stall margin of said HPC.

25. A gas turbine engine according to claim 24 wherein said HPC stall margin is increased about 1% for each 1% increase of said predetermined portion of compressed airflow bypassed by said bypassing means.

26. A gas turbine engine according to claim 23 wherein said load is an electrical generator driven by said LPT at a synchronous speed.

27. A gas turbine engine according to claim 26 wherein said synchronous speed is 3,600 revolutions per minute.

* * * * *